United States Patent [19]

Fraser-Jones

[11] Patent Number: 5,830,039
[45] Date of Patent: Nov. 3, 1998

[54] METHOD AND APPARATUS FOR THE HARVESTING OF ROYAL JELLY

[75] Inventor: Anthony Paul Fraser-Jones, Bethell, New Zealand

[73] Assignee: Royal Jelly New Zealand Limited, Waitakere, New Zealand

[21] Appl. No.: 765,385

[22] PCT Filed: Jun. 1, 1995

[86] PCT No.: PCT/NZ95/00048

§ 371 Date: Mar. 18, 1997

§ 102(e) Date: Mar. 18, 1997

[87] PCT Pub. No.: WO95/32617

PCT Pub. Date: Dec. 7, 1995

[30] Foreign Application Priority Data

Jun. 1, 1994 [NZ] New Zealand .......................... 260651

[51] Int. Cl.⁶ .................................................. A01K 47/00
[52] U.S. Cl. .................................................. 449/2; 449/44
[58] Field of Search ................................. 449/2, 18, 42, 449/44

[56] References Cited

U.S. PATENT DOCUMENTS

| | | | |
|---|---|---|---|
| 4,651,372 | 3/1987 | Schmidt | 449/2 |
| 4,672,704 | 6/1987 | Hong et al. | |
| 4,992,073 | 2/1991 | Levy et al. | 449/44 |

FOREIGN PATENT DOCUMENTS

| | | | |
|---|---|---|---|
| 2582477 | 5/1985 | France . | |
| 2555237 | 6/1977 | Germany | 449/44 |
| 4232732 | 3/1994 | Germany . | |

*Primary Examiner*—Robert P. Swiatek
*Attorney, Agent, or Firm*—Dvorak & Orum

[57] ABSTRACT

A method and apparatus for the harvesting of royal jelly. The method comprises the use of a first matrix of cell-like structures in an arrangement typical of normal worker bee cells which have interconnected plugs placed in the back of the matrix. A queen bee may then lay this matrix of cells with eggs. Upon the eggs turning into larvae, the plugs may be removed and the plugs are provided in interconnected sets such that each set provides plugs for each alternate cell in the first matrix of cells. These plugs may then be fitted to a second matrix of cells which provide larger, queen-like cells at a spacing of substantially the same as the alternate cells in the first matrix. The second matrix may then be placed in a queenless hive for the bees to fill the larger cells of the second matrix with royal jelly which may then be harvested.

13 Claims, 3 Drawing Sheets

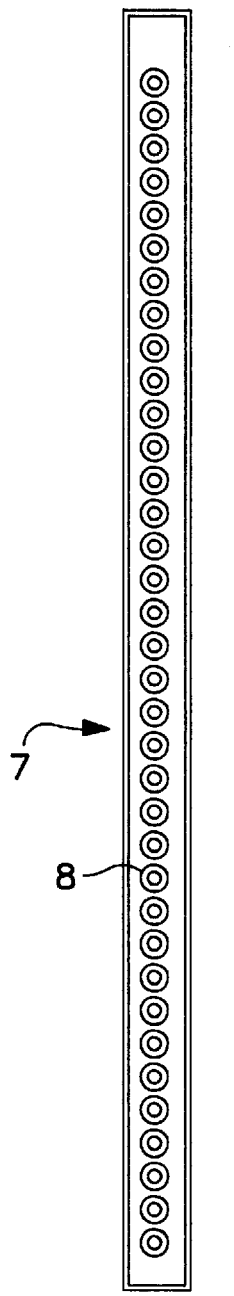
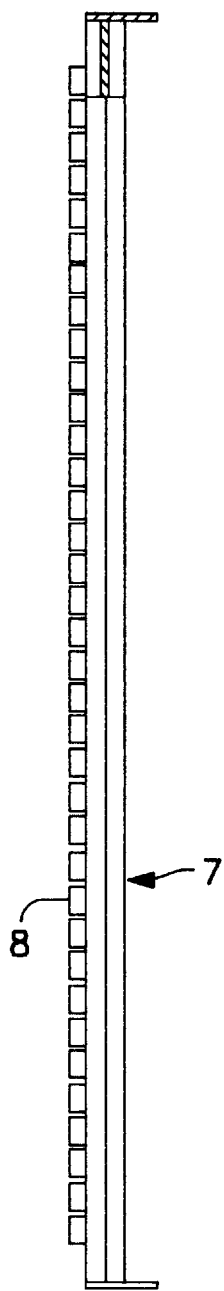
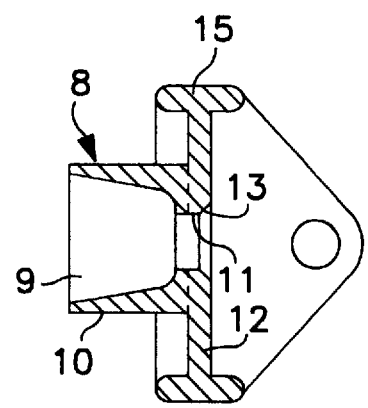
FIG. 5   FIG. 6
FIG. 7

METHOD AND APPARATUS FOR THE HARVESTING OF ROYAL JELLY

BACKGROUND

This invention relates to methods and apparatus for the harvesting of royal jelly and, in particular, a method and apparatus related to the use of interchangeable artificial cells for the collection of royal jelly.

Royal jelly is a natural product produced by bees in a hive to feed larvae and queen bees. All larvae in the hive receive a quantity of royal jelly for sustenance in their early stages. Subsequently, the royal jelly is withheld from all but queen bees. Therefore, although the largest single quantities of royal jelly can be found in queen cell hives, the largest quantity of cells receiving royal jelly are in fact those of the normal worker bee.

On this basis, the normal method of harvesting royal jelly is to remove the larvae and the small quantities of royal jelly produced into each of the numerous larvae cells from these cells. Each of these small quantities of royal jelly may be removed from the worker bee cell and placed into a much larger cell which would normally house the larva for a queen bee. When this larger cell is placed into a queenless hive, the bees will concentrate on filling this queen cell with royal jelly for the production of a queen bee.

Naturally, such a process requires considerable manual input in the removal of each of the minute quantities of royal jelly from the proportionally smaller normal cells and transplanting into larger queen cells. To assist in this, previous apparatus has been provided including a matrix suitable for implementation into a hive which may include a number of small cells in which the bees will place small quantities of royal jelly. Each of these individual cells is removable from the matrix and has an extended outlet at a distil end of the cell so that, when turned upside down, each cell now assumes the proportions of a queen cell with the small quantity of royal jelly already placed at a distil end. Each of these cells may then be placed into a queenless hive for the greater production of royal jelly.

The difficulty with such apparatus is that the matrix cannot be fully utilised to the same spacing as normal worker bee cells. The extended ends of the cells contained on the reverse side of the matrix when assuming the appearance of normal cells keep these cells well spaced apart and a number of smaller cells provided in between to assume the normal appearance of the hive are merely blind holes and not used in the production of the royal jelly.

Therefore, although this method assists in the production of royal jelly, the spacing of the calls usable in the further production of royal jelly is not as close as it may be and the apparatus still requires the removal of each of these larger plugs and individual placement of these in a hive for the further production of royal jelly.

OBJECT OF THE INVENTION

It is an object of the present invention to provide a method and apparatus which may overcome some of these disadvantages or at least provide the public with a useful choice.

SUMMARY OF THE INVENTION

Accordingly, in a first aspect, the invention may broadly be said to consist in a method for the harvesting of royal jelly comprising:

providing a first matrix of cell like structures for insertion into a beehive;

providing sets of interconnected plugs adapted to fit into the rear of the cells of the first matrix such that each set of plugs provides plugs for fitment into alternate cells on a portion of a said first matrix;

removing said plugs from said first matrix after the production of a larvae in the cells;

placing at least one set of plugs in a second line or matrix of cells and wherein the volume of each cell in said second line or matrix of cells is larger than the cells of the first matrix and the spacing of the cells within the second line or matrix is approximately equal to the spacing of alternate cells in the first matrix; and, placing said second line or matrix of cells into a queenless hive.

Accordingly, in a second aspect, the invention may broadly be said to consist in apparatus for the harvesting of royal jelly comprising:

a first matrix of cells for insertion into a beehive;

at least two sets of interconnected plugs for insertion into an end of said cells such that each set of interconnected plugs provides plugs for alternate cells on a portion of said first matrix; and a second line or matrix of cells adapted to engage at least one set of interconnected plugs and wherein said cells of said second matrix are of greater volume than said cells of said first matrix and said spacing of said cells is approximately equal to the spacing of alternate cells in said first matrix.

BRIEF DESCRIPTION OF THE DRAWINGS

Other aspects of this invention may become apparent from the following description which will be described with reference to the following drawings in which:

FIG. 5 shows a plan view of one possible embodiment of a second line of cells in accordance with a further part of the invention;

FIG. 6 shows an elevational view of the apparatus of FIG. 5; and

FIG. 7 shows a cross sectional view through the apparatus of FIG. 5.

DETAILED DESCRIPTION OF PREFERRED EMBODIMENTS

This invention relates to a method and apparatus for the harvesting of royal jelly.

In this preferred embodiment, a first matrix of cells or laying cage 1 is provided for insertion into a beehive. It may be noted that the matrix 1 generally resembles a honey comb and provides a matrix of cells 2 which are preferably of a regular pattern. Although a variety of patterns could be used for providing the cells 2 within a matrix 1 the preferred form provides them in the honey comb pattern of lines of hexagonal cells 2 so as to closely resemble the natural honey comb produced within a hive. Should the matrix not closely relate to the natural honeycomb, there is some risk that the bees may not use the matrix.

Figure 1:
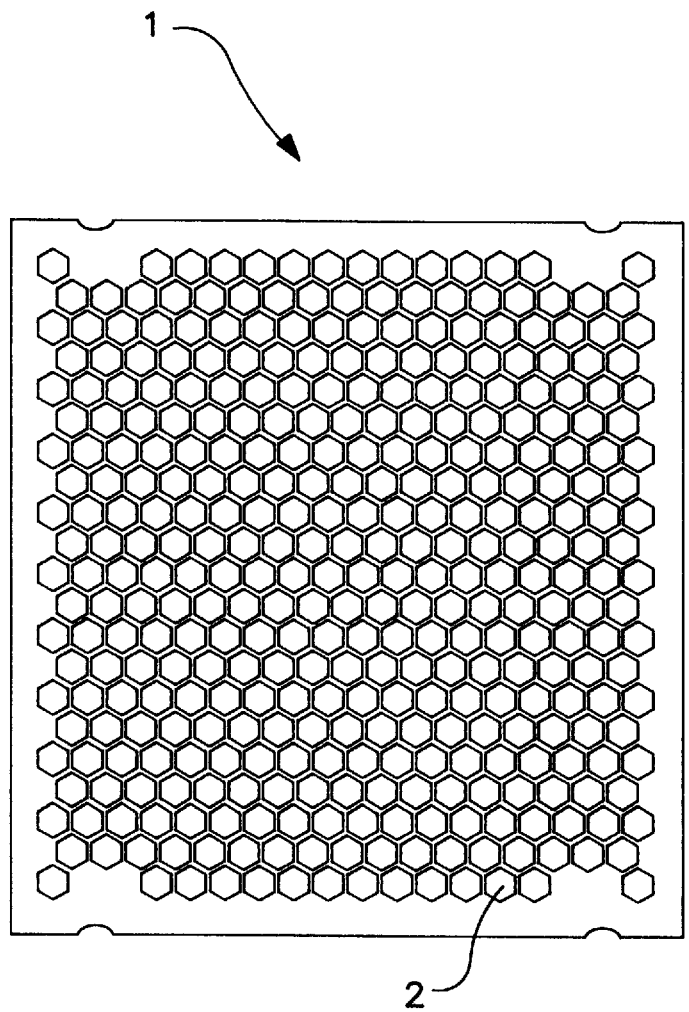
FIG. 1 shows a plan view of one embodiment of a first matrix forming part of the invention.
Figure 2:
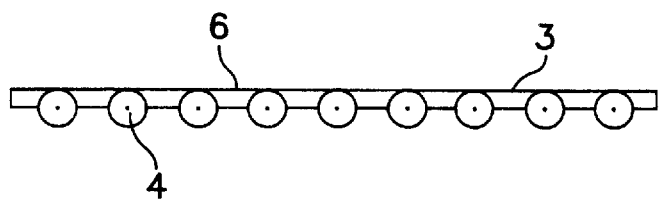
FIG. 2 shows a plan view of one embodiment of a set of interconnected plugs forming part of the invention.

To fit within the cells 2 provided in the matrix 1, a series 3 of interconnected plugs 4 are provided as shown in FIG. 2. Each plug 4 is adapted and dimensioned to fit within the cells 2 and is preferably provided with a recess 5 to carry a larvae and a small portion of royal jelly once the bees have worked the matrix 1.

In this preferred form, the plugs 4 are interconnected by a backing strip 6. This provides the plugs 4 in a substantially linear relationship.

Figure 3:
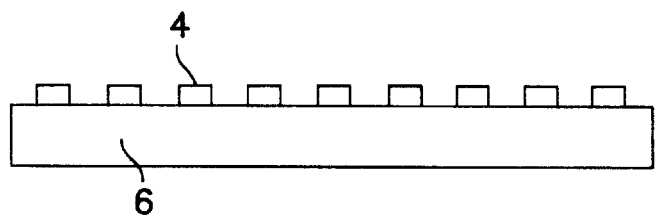
FIG. 3 shows an elevational view of the set of plugs shown in FIG. 2.
Figure 4:
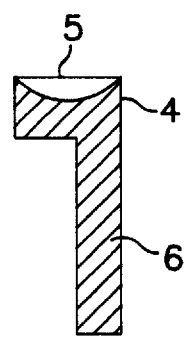
FIG. 4 shows a cross sectional view through the set of plugs shown in FIG. 2.

When two sets or strips such as those shown in FIGS. 2 through 4 are provided, the strips may overlap to provide plugs 4 provided on one interconnected strip 3 and a second series of plugs 4 intermediate of each of the first series of plugs 4 provided on a second strip of plugs 3. This can be done by simply rotating a further strip of plugs 4 as shown in the plan view FIG. 2 so that the backing strip 6 of the rotated set of plugs may nest against the strip 6 of a first set of plugs 3. This will provide a single set of plugs approximately in line with each other and with the two backing strips 6 adjacent each other.

Turning to FIG. 4, it can be seen that in the preferred form of the backing strip 6 is well biased to one side of the plug 4 so as to accommodate a second backing strip 6 adjacent and allowing the plugs 4 to remain in line with each other.

FIG. 4 also shows a recess 5 provided in the face of the plug 4 to receive the royal jelly provided in the initial processing step.

The invention also provides a second line or matrix of cells such as the line 7 of cells 8 shown in FIG. 5. Although these figures show a linear organisation of the cells 8, they could equally be accommodated in a matrix form.

The cells 8 in the second matrix are of greater volume that the cells in the first matrix. These cells 8 simulate queen cells and, due to the size of each cell 8, the spacing between each cell 8 is greater than the spacing in the first matrix of cells 1.

FIG. 7 shows a cross section through a cell in an enlarged view. It can be seen that the cell 8 comprises a cavity 9 surrounded by substantially circular cell walls 10. Of course, structures comprising other than circular cell walls 10 could also be used.

The large cavity 9 terminates at a distil end in a restricted passage 11 through to the rear face 12 of the cell 8. This restricted opening 11 should be dimensioned to receive the plugs 4 used in conjunction with the first matrix 1. To ease fitment of the plugs 4 into the restricted opening 11, chamfered edges 13 may be provided in the support web 15 adjacent the rear face 12.

In use, a first matrix 1 of cells 2 is provided for fitment into a beehive. Strips or lines 3 of plugs 4 are provided with two such lines placed adjacent each other such that the plugs 4 on both lines provide a substantially linear relationship and alternate plugs in the composite line of plugs 4 are interconnected by a web 6. These plugs are then placed along a line of cells 2 within the first matrix 1 prior to fitment of the matrix 1 into the beehive.

This first matrix 1 may be placed in a hive with a queen so that the cells may receive eggs from the queen.

The bees believing these cells to be their own cells will care for the calls to enhance the growth of any larvae placed in the cells. The first matrix 1 will generally assume the proportions of normal worker bee cells and receive a consequential small dose of royal jelly.

Once this first matrix 1 has been attended to by the bees, the matrix may be removed and the strips 3 of plugs 4 removed from the rear of the matrix 1. By separating the overlapping strips 3 of plugs 4, each single strip 3 of plugs 4 assumes a spacing between the plugs 4 of approximately twice the spacing of the composite strip through the ajoinment of only each alternate plug 4 in the strip.

These strips 3 of plugs 4 may then be placed in the rear of the cells 8 of the second line or matrix of cells 7 by fitment of the plugs 4 within the restricted openings 11 in the rear of the cells 8. Each plug 4 will be carrying the small quantity of royal jelly in the small recess 5 provided in the face of the plugs 4.

This second line or matrix of cells 8 now incorporating the plugs 4 may be placed into a queen less hive so that the bees may assume each of the cells 8 to be a possible queen cell and produce greater quantities of royal jelly in the hope of producing a queen bee.

Subsequent removal of this second matrix 7 will allow for the removal of the royal jelly from the cells 8 in greater quantities than could be obtained from the much smaller cells 2 of the first matrix 1.

In this preferred embodiment, it can be seen that the strips 3 of plugs 4 may incorporate, for example, nine plugs 4. With two such strips placed adjacent each other, these may assume a line of 18 cells 2 within a first matrix 1.

Upon removal of both strips of plugs 4, these may be accommodated in an 18 cell second matrix as shown in FIGS. 5 and 6.

Due to the alternate nature of the provision of the plugs 4 on each strip 3, the resultant spacing between the cells 8 on the second line or matrix of cells 7 should be approximately twice that of the first matrix.

Although the timing of the method of harvesting may very according to conditions, it has been found that the method may be implemented by placing a queen bee into the laying cage which contains the first matrix of cells 1 and the matrix may be fully laid within approximately eight hours. The queen may then be transferred to a further laying cage containing a further matrix of cells.

The laying cage may then be left open to the bees so that they may care for the first matrix 1 containing the eggs for, approximately, three days. This is generally sufficient for the eggs to change into small larvae suitable for being transplanted into the larger queen cells.

On transferring the plugs carrying the larvae into the second matrix of calls in placement of this matrix into a queenless hive, it has been found that, approximately three days is sufficient for the bees in that hive to till the larger second matrix of cells with royal jelly. It is at this time that the royal jelly may be harvested.

Thus it can be seen that the invention provides a method of harvesting royal jelly requiring less manual input into the transfer of smaller plugs of royal jelly into larger cells 8 assuming the status of queen cells.

Although the preferred embodiment of this invention provides a line of plugs 4 which, in placed adjacent a second such line of plugs 4, will provide a substantially linear relationship between all of the plugs 4 on both strips, it may also be possible to arrange interconnected strip 6 of plugs 4 which provide an alternate spacing of coverage amongst a first matrix 1 such as interconnected off-set plugs 4 which, when overlapped, still provide a full coverage amongst two such overlapped strips of two rows of calls 2 within a first matrix 1 rather than a single row as in this preferred embodiment.

Thus it can be seen that the invention provides an improved method and apparatus for the harvesting of royal jelly.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

I claim:

1. A method for the harvesting of royal jelly comprising:

providing a first matrix of cells for insertion into a beehive;

providing sets of interconnected plugs adapted to fit into a rear of the cells of the first matrix such that each set of plugs provides a plug for fitment into alternate cells on a portion of said first matrix;

placing said plugs into said first matrix;

removing said plugs from said first matrix after the production of a larvae in the cells;

placing at least one set of plugs in a second line or matrix of cells wherein the volume of each cell in said second line or matrix of cells is larger than the cells of the first matrix and the spacing of the cells within the second line or matrix is approximately equal to the spacing of alternate cells in the first matrix; and, placing said second line or matrix of cells into a queenless hive.

2. A method of harvesting royal jelly as claimed in claim 1 wherein said sets of interconnected plugs are provided as strips of interconnected plugs to engage each alternate cell in said first matrix and adjacent cells in said second matrix.

3. A method for the harvesting of royal jelly as claimed in claim 2 wherein said sets of plugs are provided as overlapping substantially linear strips of interconnected plugs.

4. Apparatus for the harvesting of royal jelly comprising:

a first matrix of cells for insertion into a beehive;

at least two sets of interconnected plugs for insertion into an end of said calls such that each set of interconnected plugs provides plugs for alternate cells on a portion of said first matrix; and, a second line or matrix of cells adapted to engage at least one set of interconnected plugs and wherein said cells of said second matrix are of greater volume than said cells of said first matrix and the spacing of said cells of said second matrix is approximately equal to the spacing of alternate cells in said first matrix.

5. An apparatus as claimed in claim 4 wherein at least one of said first matrix, said second matrix, and said plugs are made from plastic.

6. An apparatus as claimed in claim 5 wherein said plastics is TPX or methyl pentene polymer.

7. An apparatus as claimed in claim 6 wherein said sets of interconnected plugs are provided as substantially linear strips of interconnected plugs to engage alternate cells in a line of said first matrix and adjacent cells within said second matrix.

8. An apparatus as claimed in claim 7 wherein said strips of interconnected plugs comprise plugs having a recess within one face to receive said larvae and an interconnecting backing strip at a distal end of said plug from that provided with said recess.

9. An apparatus as claimed in claim 5 wherein said sets of interconnected plugs are provided as substantially linear strips of interconnected plugs to engage alternate cells in a line of said first matrix and adjacent cells within said second matrix.

10. An apparatus as claimed in claim 9 wherein said strips of interconnected plugs comprise plugs having a recess within one face to receive said larvae and an interconnecting backing strip at a distal end of said plug from that provided with said recess.

11. An apparatus as claimed in claim 4 wherein said sets of interconnected plugs are provided as substantially linear strips of interconnected plugs to engage alternate cells in a line of said first matrix and adjacent cells within said second matrix.

12. An apparatus as claimed in claim 11, wherein said strips of interconnected plugs comprise plugs having a recess within one face to receive said larvae and an interconnecting backing strip at a distal end of said plug from that provided with said recess.

13. An apparatus as claimed in claim 12 wherein said backing strip is provided and connected to said plugs over no more than half of a rear face of said plugs such that two such strips of interconnected plugs may be overlapped with the backing strips adjacent each other and the plugs forming a substantially linear line of plugs for fitment into said first matrix.

* * * * *